July 7, 1925.
C. B. MILLS
1,544,586
MAGNETIC THRUST BEARING
Filed March 10, 1920
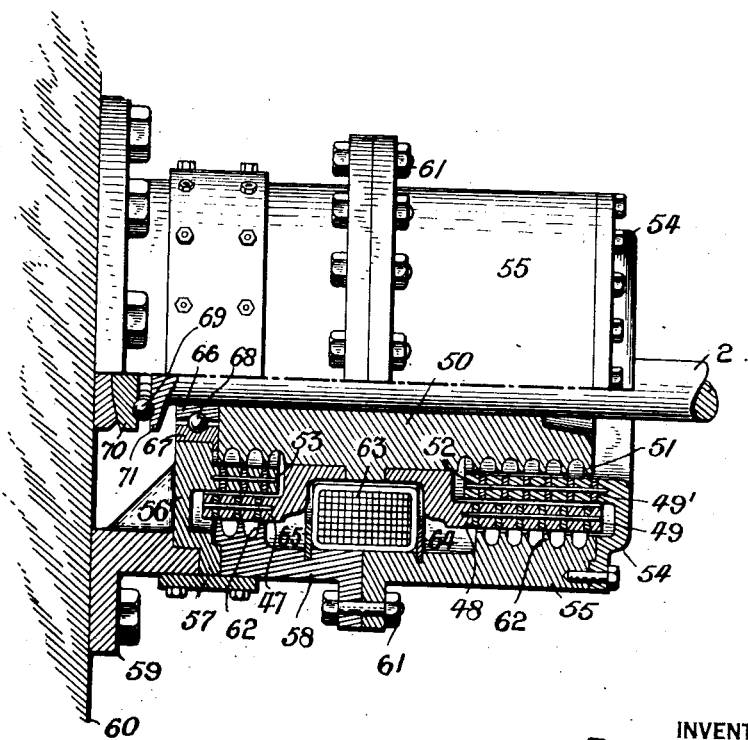
INVENTOR
CHESTER B. MILLS.
BY
Herbert H. Thompson
his ATTORNEY Patented July 7, 1925.

1,544,586

UNITED STATES PATENT OFFICE.

CHESTER B. MILLS, OF BROOKLYN, NEW YORK, ASSIGNOR TO THE SPERRY GYROSCOPE COMPANY, OF BROOKLYN, NEW YORK, A CORPORATION OF NEW YORK.

MAGNETIC THRUST BEARING.

Application filed March 10, 1920. Serial No. 364,684.

*To all whom it may concern:*

Be it known that I, CHESTER B. MILLS, a citizen of the United States of America, residing at 26 Stratford Road, Brooklyn, New York, in the county of Kings and State of New York, have invented certain new and useful Improvements in Magnetic Thrust Bearings, of which the following is a specification.

This invention relates to magnetic thrust bearings and has for its object the provision of an improved device of this character, of rugged construction, which will operate in a safe, reliable and efficient manner. My invention will be better understood from the following description taken in connection with the accompanying drawing, and its scope will be pointed out in the appended claims.

Referring to the drawing wherein I have shown what I now consider the preferred form of my invention:

The figure is a partly sectional view of a magnetic thrust bearing embodying my invention.

The thrust bearing which I have devised serves to support a shaft magnetically against thrusts and may be constructed substantially as follows, and it will be obvious that the bearing may easily be used as a thrust bearing for various kinds of shafts, either horizontal or vertical.

Rotatable with a shaft 2 are circumferential inserts 49 of magnetic material. Said inserts may be in the form of rings and may be secured to shaft 2 through annular members 47 and 48 of non-magnetic material and member 50. The latter member is rotatable with shaft 2 and is shown provided with teeth 51 corresponding in spacing and number with inserts 49 and preferably in the form of annular ridges. Interposed between inserts 49 and teeth 51 are magnetic inserts 49', preferably in the form of rings concentric with rings 49 and supported by non-magnetic members 54 and 56. Inserts 49' are shown alternating with rings 52 and 53 of non-magnetic material, while inserts 49 are likewise interposed between non-magnetic rings. The non-magnetic rings and magnetic inserts may be secured to their respective supporting members in any suitable conventional way, such as by means of pins as shown. Members 54 and 56 may be bolted or otherwise secured to the ends of casing sections 55 and 58, respectively, the latter sections being fastened together, as shown, by bolts 61 and being also provided with annular ridges or teeth 62 corresponding in spacing and number with inserts 49'. While the teeth 51 and inserts 49, carried by the shaft 2, correspond in number and spacing, and while the teeth 62 and inserts 49' carried by the casing sections 55, 58, correspond in number and spacing, the teeth and inserts carried by the shaft 2 are not in alignment with the teeth and inserts carried by the stationary casing sections, but are slightly displaced with respect thereto, as shown in the figure. An annular member 57 may serve to connect casing sections 55 and 58 with a bracket 59 as shown, the said bracket being carried by any suitable support 60. For passing magnetic flux through the teeth and inserts, a coil 63 is shown mounted between spacing members 64 and 65 carried by casing members 55 and 58, respectively. A radial bearing comprising race members 66 and 67 and balls or other anti-friction members 68 may be interposed between shaft 2 and member 56, the other end (not shown) of shaft 2 being, of course, supported by a similar radial bearing.

From the construction above described, it will now be seen that, when coil 63 is energized, magnetic flux will pass through the magnetic inserts 49, 49' and teeth 51 and 62. As a result, the inserts and teeth carried by shaft 2 will tend to align themselves with the inserts and teeth carried by support 60, and a force will thereby be exerted on shaft 2 tending to move said shaft longitudinally. Since the shaft 2 has little or no longitudinal movement, the teeth and inserts carried by the rotatable member 2 never align with the teeth and inserts of the stationary parts 55, 58. By this arrangement, a distorted flux is obtained, of greater magnetic force than if the teeth and inserts were permitted to align, and consequently the magnetic bearing has the maximum carrying power. This, of course is due to the fact that the magnetic flux density is greater at the corners of the teeth inserts, which is readily understood by those skilled in the art. Whenever coil 63 is energized, shaft 2 will thus be magnetically supported against longitudinal thrusts. By providing a plurality of air gaps between a plurality of radially spaced poles, the thrust which the bearing is able to support is very much greater for a given current strength than if the single gaps were employed. Also, by dividing the path of the magnetic flux into a plurality of radial planes, this effect is further increased at the same time avoiding saturating the iron. An auxiliary or emergency thrust bearing comprising anti-friction members 69 and race members 70 and 71 may be provided as shown for use in case the circuit through coil 63 should be broken.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination, a rotatable element, a stationary element, a thrust bearing operating between said elements comprising an annular member fixed on said first named element, an annular member carried by said stationary element concentric with said first named member, and circumferential magnetic inserts carried by said annular members said inserts being permanently out of alignment with each other.

2. In combination, a rotatable element, a stationary element, a thrust bearing operating between said elements, an annular member fixed on said first named element, an annular member carried by said stationary element concentric with said first named member circumferential magnetic inserts carried by said members, said inserts being permanently out of alignment with each other and means for magnetizing said inserts.

3. In combination, a rotatable element, a stationary element, a thrust bearing operating between said elements, an annular member fixed on said first named element, an annular member carried by said stationary element concentric with said first named member circumferential magnetic inserts carried by said annular members and means for magnetizing said inserts, the inserts in the two members being so positioned relatively as to exert a force tending to pull said elements apart in a direction parallel with the axis of said rotatable elements without disturbing their relative position.

4. In combination, a rotatable shaft, a plurality of magnetic members connected thereto, and spaced longitudinally of the shaft, a bearing for said shaft, a plurality of magnetic members connected to said bearing and in proximity to the first mentioned magnetic members and correspondingly spaced but permanently out of alignment therewith, and means carried by said bearing for passing magnetic flux through all of said magnetic members.

5. In combination, a rotatable shaft, a bearing for said shaft, and a plurality of alternate concentric rings of magnetic material and non-magnetic material carried by said shaft and bearing respectively said magnetic rings being relatively fixed out of alignment with each other.

6. In combination, a rotatable element, a stationary element, a plurality of radially spaced concentric magnetic members carried by one of said elements, and a cooperating circumferential magnetic member positioned between said first mentioned members carried by the other element.

7. In combination, a rotatable shaft, a casing surrounding said shaft and provided with a bearing within which said shaft rotates, cooperating magnetic members encircling said shaft carried by said shaft and casing respectively positioned to prevent their aligning, and means within said casing surrounding said shaft for passing magnetic flux through said members.

8. In combination, a rotatable member, a stationary member in which said rotatable member is journaled, and a plurality of rows of magnetic devices secured to each member, each of at least two of said rows on one member cooperating with a row on the other member and positioned to prevent their aligning.

9. In combination, a rotatable shaft, an annular member rotatable therewith, a stationary member having a bearing within which said shaft rotates and provided with an annular member concentric with the first mentioned annular member, and magnetic inserts carried by said annular members, the inserts of the respective members being permanently out of alignment.

10. A thrust bearing comprising in combination a rotatable element having a plurality of radially spaced concentric magnetic members, and a stationary element having a plurality of radially spaced concentric magnetic members, said magnetic members of said elements being interspersed radially.

11. A thrust bearing comprising in combination a rotatable element having a radially spaced concentric magnetic member, a stationary element having a radially spaced concentric magnetic member, said magnetic members of said elements being interspersed radially, and a plurality of axially spaced magnetic inserts on said magnetic members.

12. A thrust bearing comprising in combination a rotatable element having a plurality of radially spaced concentric magnetic members, a stationary element having a plurality of radially spaced concentric magnetic members, said magnetic members of said elements being interspersed radially, and means for passing a distorted magnetic flux through said elements.

13. A thrust bearing comprising in combination a rotatable element having a radially spaced concentric magnetic member, a stationary element having a radially spaced magnetic member, said magnetic member of said elements being interspersed radially, and a plurality of axially spaced magnetic inserts on said magnetic member, said inserts being relatively fixed out of alignment.

14. In combination, a rotatable element, a stationary element, a thrust bearing operating between said elements comprising an annular member fixed on said first named element, an annular member carried by said stationary element concentric with said first named member, axially spaced magnetic teeth carried by each of said elements, and axially spaced magnetic inserts carried by each of said members, the inserts of the respective members being permanently out of alignment.

In testimony whereof I have affixed my signature.

CHESTER B. MILLS.